Figure 1:
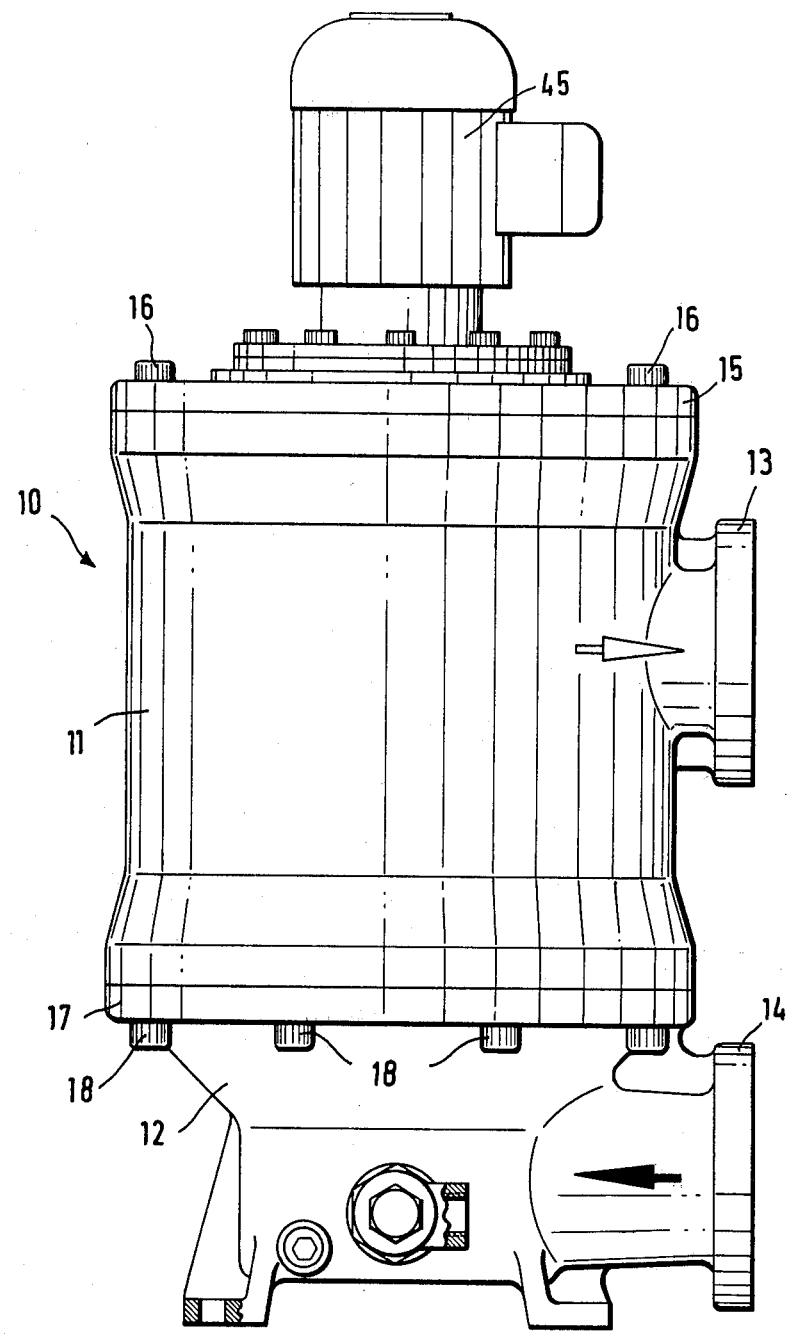

United States Patent [19]
Lennartz et al.

[11] 4,415,448
[45] Nov. 15, 1983

[54] FLUSH-BACK FILTER

[75] Inventors: Rüdiger Lennartz, Pulheim; Joachim Gutermuth, Gettorf, both of Fed. Rep. of Germany

[73] Assignee: Boll & Kirch Filterbau GmbH, Kerpen, Fed. Rep. of Germany

[21] Appl. No.: 367,349

[22] Filed: Apr. 12, 1982

[30] Foreign Application Priority Data

Apr. 18, 1981 [DE] Fed. Rep. of Germany ....... 3115716

[51] Int. Cl.³ .............................................. B01D 23/24
[52] U.S. Cl. ................................................. 210/333.1
[58] Field of Search ............. 210/323.2, 333.01, 333.1, 210/334, 340, 341, 142, 345, 355

[56] References Cited

U.S. PATENT DOCUMENTS

| 1,172,689 | 2/1916 | Elliott | 210/323.2 |
| 2,679,320 | 4/1954 | Walton | 210/168 |
| 3,268,442 | 8/1966 | Pall et al. | 210/323.2 |
| 3,615,016 | 10/1971 | Soriente et al. | 210/323.2 |
| 4,035,295 | 7/1977 | Pluequet | 210/136 |
| 4,119,540 | 10/1978 | Muller | 210/142 |
| 4,256,583 | 3/1981 | Lennartz | 210/333.1 |

FOREIGN PATENT DOCUMENTS

| 1801441 | 12/1968 | Fed. Rep. of Germany . |
| 2021918 | 11/1971 | Fed. Rep. of Germany . |
| 2141363 | 3/1972 | Fed. Rep. of Germany . |
| 6946797 | 11/1975 | Fed. Rep. of Germany . |
| 2620435 | 11/1977 | Fed. Rep. of Germany . |
| 2757090 | 6/1978 | Fed. Rep. of Germany . |
| 207588 | 11/1923 | United Kingdom . |

Primary Examiner—Ivars C. Cintins
Attorney, Agent, or Firm—Body, Vickers & Daniels

[57] ABSTRACT

The invention relates to a flush-back filter, in particular for the filtration of oil, having filter elements (filter cartridges) arranged in a circle in the filter housing and a flushing member rotatable around the filter axis for the back-flushing of filter elements with the filtrate. According to the invention said filter elements are arranged on at least two concentric circles within the interior of said filter housing whereby said filter elements lying on one circle are located in the gaps between said filter elements lying on the other circle. For back-flushing of said filter elements horizontal on the concentric circle, there is a common flushing member below and with a small radial dimension, which is driven by a rotary drive. The back-flush filter has at least fourteen to twenty filter elements. Furthermore, a safety filter is arranged on the interior of the filter housing, which encircles said filter elements.

18 Claims, 4 Drawing Figures

FLUSH-BACK FILTER

This invention relates to a flush-back filter, having in its filter housing a group of filter elements, in particular filter cartridges, in a circular arrangement, as well as a rotary flushing member with which the filter elements and back-flushed with the filtrate are connectable in series to a sludge drain.

BACKGROUND

Flush-back filters of this kind are preferably used for the filtration of fuels and lubricating oils. In the known flush-back filters, the cylindrical filter elements are grouped within the filter chamber in a circle around the filter axis and fixed to an apertured plate which divides off the filter chamber fitted with the filter outlet from the intake chamber fitted with the filter inlet on the fouled side of the filter. In the lower intake chamber, the flushing member is rotatably arranged around the filter axis, made up of a radial flushing arm, which for the performance of the flushing operation respectively overlaps with its opening a lower inlet opening of the filter elements, with the result that the respective filter element is cleaned by the filtrate flowing inwards from the outside (DE-OS No. 20 21 918, DE-OS No. 27 57 090, DE-GM No. 69 46 797, DE-OS No. 26 20 435). With these flush-back filters the flushing arm is gradually rotated further, something which is effected by means of a rotary drive mechanism seated on the filter housing or accommodated in the interior space between the filter elements arranged on one circle.

The known-flush-back filters are not free from disadvantages. The flush-back operation is carried out discontinuously with these filter appliances using quite large quantities of filtrate as flushing fluid. Upon changeover of the flushing arm, considerable pressure surges can occur within the conduit system. Besides this, the known flush-back filters are mostly relatively large in construction, something which is disadvantageous in the case of the confined mounting spaces often available. The flushing arm has a relatively large lever arm, thus making a large energy consumption necessary for its rotary motion. The known flush-back filters must be used together with a so-called safety filter, which is arranged in the oil circulation between the flush-back filter and the internal combustion engine, so that the former cleans the oil flowing to the internal combustion engine in the event of damage to the flush-back filter. The mesh width of the safety filter is generally two or four times larger than that of the filter elements of the flush-back filter.

THE INVENTION

The problem of the invention is to design a flush-back filter of the initially named type, preferably intended for the filtration of oil, in such a way that with a compact, reliable and easily maintainable design the desired filter outputs are achievable, without greater quantities of filtrate having to be drained off periodically for flush-back purposes.

According to the invention, the filter elements are arranged on at least two concentric circles, whereby the filter elements located on the one circle lie in the gaps between the filter elements located on the other circle, and whereby a common flushing member is provided for back-flushing of the filter elements located on the concentric circles. There are preferably at least seven filter elements on each circle, expediently, however, at least nine or ten filter elements arranged at a peripheral distance from one another.

The flush-back filter according to the invention has therefore a plurality of filter elements, preferably slim filter cartridges, which are arranged vertically in staggered gaps at a relatively close peripheral distance on at least two pitch circles, enabling a relatively large filter area to be accommodated in a small space requirement. The use of a large number of filter elements makes it possible to carry out the filter operation and flush-back operation practically continuously by one or even two filter elements constantly being cleaned. This can be carried out with a high flushing effect, without more than about 10% of the filtrate quantity having to be tapped off for flushing purposes. The filter cartridges form relatively small filter elements which are cheap to replace.

In a further embodiment of the invention, the rotatable flushing member has a diameter which is smaller than the diameter of the inner circle of the filter elements; thereby the arrangement is such that the flush channel of the flushing member opens into a connection opening located on its cylindrical circumferential surface. This embodiment of the flushing member contributes to the compact design of the flush-back filter according to the invention and has furthermore the advantage that the rotatable flush member can have comparatively small radial dimensions, so that there is also a relatively smaller frictional radius of the flushing member and, accordingly, a lower energy consumption for the rotary motion. The filter housing has for this purpose under its filter chamber accommodating the filter elements and fitted with a filter outlet, a plurality of elbow ducts arranged in a circle around the filter axis, the duct sections whereof parallel to the filter axis are coupled with the lower ends of the filter elements and the radial duct sections whereof open onto a cylindrical distributor surface to which the flushing member leads with its circumferential surface having a connection opening. The arrangement is such that the openings of the elbow ducts are arranged at a circumferential distance from one another which is smaller than the circumferential dimension of the connection opening of the flushing member. Thus, a flushing of the individual filter elements is achieved by overlapping and pressure surges are avoided.

The filter elements arranged on various circles are for this purpose fixed to a common apertured plate preferably by means of a screwed or plug connection, whereby the apertured plate is advantageously detachably mounted in the filter housing. This offers the possibility of removing the entire filter body together with the numerous filter elements as a module from the filter housing and of fitting it therein and/or detaching and exchanging the filter elements individually.

According to a further essential feature of the invention, the named filter elements are arranged in a safety filter with a larger opening width. The safety filter is, therefore, in this case accommodated in a joint housing together with the filter elements of the main filter, thus leading to a considerable simplification of the filter system and offering the possibility of building the flush-back filter directly onto the motor. The safety filter can similarly be detachably mounted in the filter housing. It consists purposefully of a cylindrical support sleeve covered with a filter tissue, where the mesh width is about two to four times larger than the mesh width of the filter fabric on the filter cartridges.

According to a further feature of the invention, a pressure-operated shut-off valve is arranged in the sludge drain of the flush-back filter, which has for this purpose a control piston pressure loaded at the filter inlet side. During normal operation, the sludge drain valve is opened by the pressure acting upon its control piston on the soiled side of the filter, i.e., in the intake chamber of the same, with the result that the flush-back operation can be carried out practically continuously. In shut-off operation on the other hand, the sludge drain valve closes the sludge drain, thus ensuing that the filter chamber of the flush-back filter does not run empty during shut-off operation. In addition, the sludge drain valve prevents the channelling off of oil during motor prelubrication. In view of the desired compact construction of the flush-back valve a horizontal arrangement of the sludge drain valve below the flushing member is recommended. The flushing member has for this purpose an axial shoulder which is rotatably coupled with a chamber arranged in the filter housing forming the sludge drain, which accommodates the sludge drain valve. Moreover, a throttle can be arranged in the sludge drain to set the flush current flowing off via the sludge drain.

For this purpose an easily exchangeable throttle in the form of a perforated hexagonal screw or the like can be used. Furthermore, the fitting of a magnetic plug in the sludge drain pipe is recommended in order to remove magnetic impurities from the discharged sludge.

The flushing member can be progressively rotated or can circulate continuously. The rotary drive is expediently arranged in the interior space of the filter housing encircled by filter elements, which is similarly advantageous as regards the small construction dimensions of the flush-back filter desired.

The filter housing of the flush-back filter according to the invention consists preferably out of a housing section containing the filter outlet and the filter chamber together with the filter elements and a housing section containing the filter inlet as well as sludge drain, whereby both housing sections are connectable with one another in different rotary positions. This filter housing design makes it possible to bring the filter inlet and filter outlet into the most favourable rotary position for the respective mounting type, whereby due to its compact construction the flush-back filter can be mounted as close as possible to the lubrication point, resp. the motor. The flush-back filter according to the invention can moreover be arranged vertically or horizontally, something which is advantageous for the mostly restricted mounting spaces available. An electrical or hydraulic drive can be used as rotary drive for the flushing member. When using a hydraulic drive this can be operated by the filtered oil. The rotary drive has only a small energy requirement.

DRAWINGS

Figure 2:
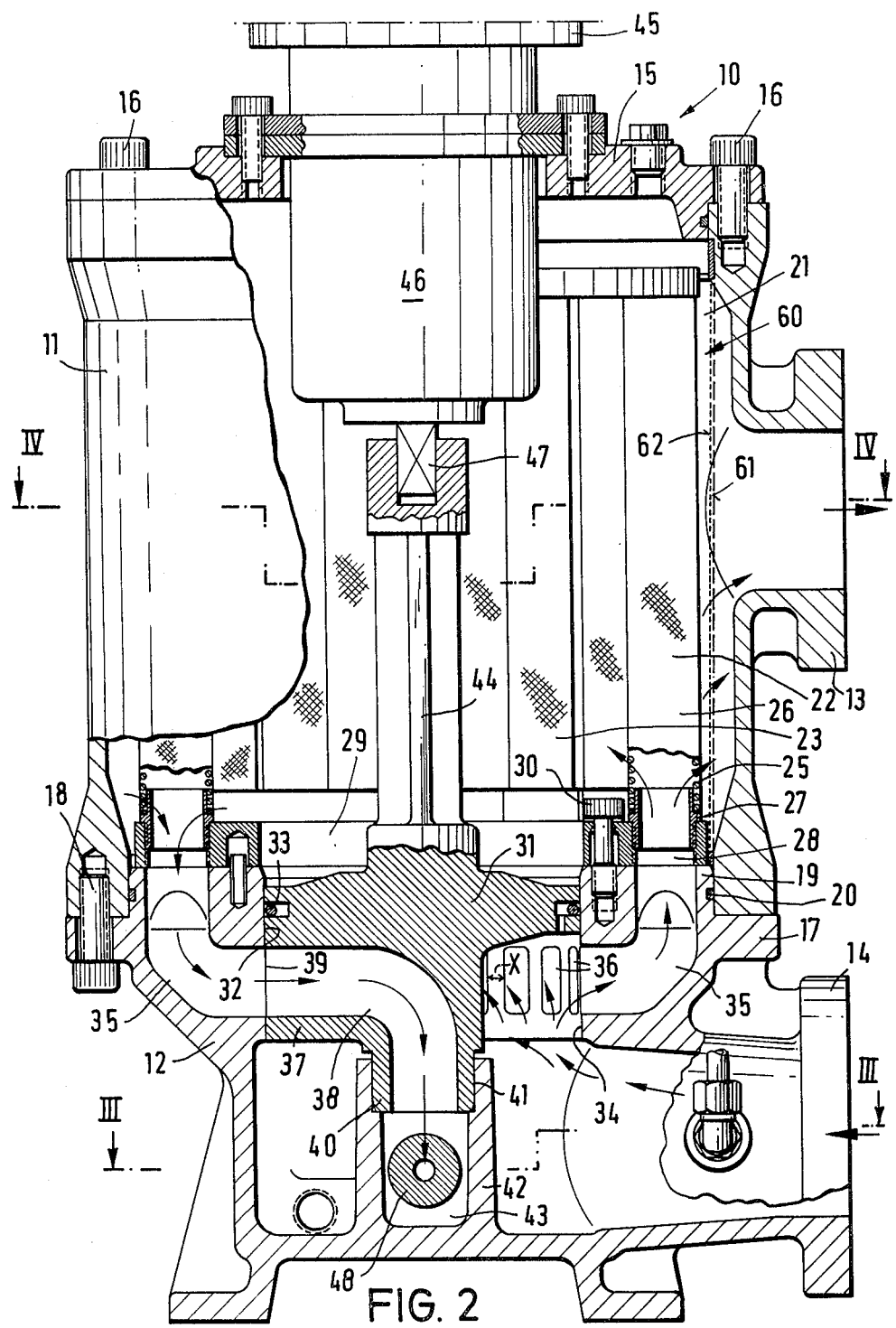
Figure 3:
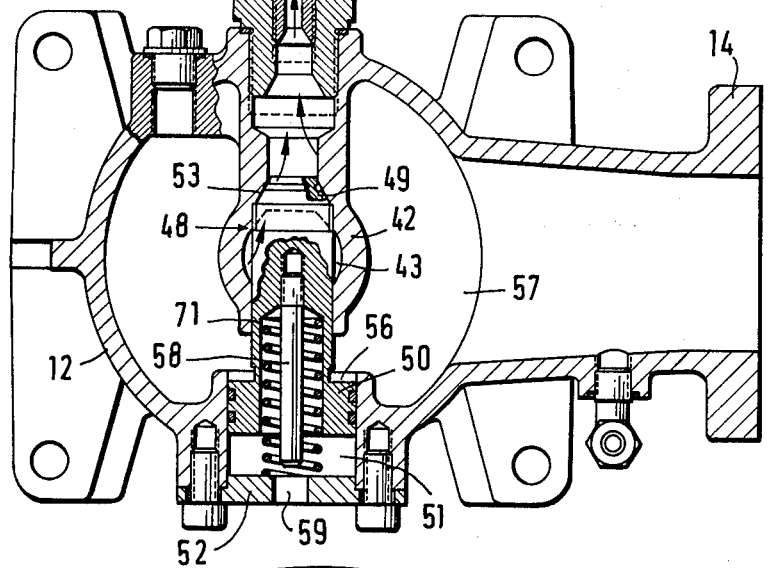

The invention is subsequently explained in more detail in connection with the embodiment example illustrated in the drawing. The drawing shows:

FIG. 1: A flush-back valve according to the invention, in laterial view;

FIG. 2: The flush-back valve according to FIG. 1 in axial section;

FIG. 3: A cross-section following the line III—III of FIG. 2; and

Figure 4:
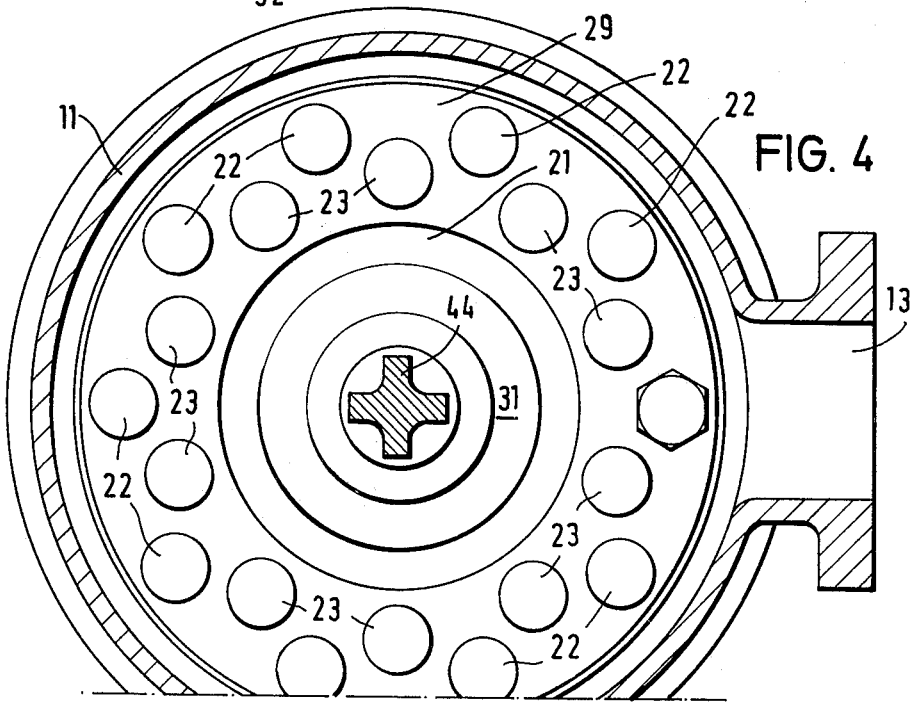

FIG. 4: A cross-section following the line IV—IV of FIG. 2.

PREFERRED EMBODIMENT

The illustrated flush-back filter has a filter housing 10, which consists of two housing sections 11 and 12, whereof the housing section 11 bears at its periphery a filter outlet 13 in the form of a flange-like connection and the housing section 12 similarly has a filter inlet 14 in the form of a flange connection. The housing section 11 is sealed at its upper end by a housing cover 15 which is detachably mounted by means of screws 16. The lower housing section 12 has a housing flange 17, by which it is screw coupled together with the upper housing section 11. The screwed coupling is preferably made by at least eight to twelve screws 18, which are arranged at circumferential distances of 45° to 30° to one another, with the result that the two housing sections 11 and 12 can be connected with one another according to the screw graduation into various rotary positions and accordingly also in varying positions of the filter inlet 14 and the filter outlet 13. This enables the accommodation of the flush-back filter even in confined mounting spaces in the respective most favourable position arrangement of the filter inlet and filter outlet. The lower housing section 12 has an axial cylindrical centering shoulder 19, with which it engages into the cylindrical opening of the upper housing section 11, whereby the two housing sections centered in relation to one another are sealed off from one another by means of a gasket 20.

The upper housing section forms the actual filter chamber 21, which accommodates a plurality of cylindrical filter elements 22 and 23, consisting of known filter cartridges. The filter elements 22 and 23 are of the same shape and dimension. As FIG. 4 in particular shows, the filter elements 22 and 23 are grouped around the axis of the filter housing 10, whereby the filter elements 22 are arranged on an outer pitch circle and filter elements 23 on an inner pitch circle. In the case of the illustrated embodiment example ten filter elements 22 resp. 23 are arranged on each pitch circle at equal circumferential distances from one another. It is recognizable from FIG. 4 that the filter elements 23 are arranged at a circumferential distance from one another, which is not significantly larger than the diameter of these cylindrical filter elements. The filter elements 22 on the outer pitch circle are staggered in a circumferential direction in relation to the filter elements 23 on the inner pitch circle, so that in each case they are located in the gaps between two filter elements 23. The radial distance of the center lines of the inner filter elements 23 to the center lines of the adjacent outer filter elements 22, i.e. the difference between the radius of the outer pitch circle and the radius of the inner pitch circle is smaller than the diameter of the individual filter elements 22, 23; this distance is about ½ to ⅔ of the cartridge diameter.

The filter elements in the preferred embodiment filter cartridges 22 and 23 consist in the known manner respectively of a cylindrical wire-support 25, bearing a hose-shaped filter fabric 26 and having a base 27 at its lower end, by which the filter cartridge is screwed into an opening 28 of an apertured plate 29. The apertured plate 29 supports all filter elements 22 and 23. It has, accordingly, thread openings 28 located on two pitch circles for the filter elements 22 and 23.

The apertured plate 29 is detachable mounted by means of screws 30 to the front face of the lower housing section 12. After releasing of screws 30 and removal of the housing cover 15 the filter insert consisting of the filter elements 22, 23 and the apertured plate 29 can be lifted out from the top of the housing. At the same time, it is possible to unscrew the individual filter elements 22 and 23 and dismantle them from the apertured plate 29 with the housing cover 15 released.

The lower housing section 12 accommodates a flushing member 32 rotatable around the filter axis, which is smaller than the diameter of the inner pitch circle of the filter elements 23. The housing section 12 has a bore 32 for the cylindrical flushing member 31, which is sealed at its periphery from the cylindrical inner wall of the bore 32 by means of a gasket 33. The bore 32 forms in the lower zone a cylindrical distributor surface 34 into which the ducts 35 leading to the individual filter elements 22 and 23 open out into a rectangular or elongated type opening 36. The openings 36 are located on a common pitch circle, whereby an individual opening 36 is provided for each filter element 22, 23 and correspondingly an individual connection duct 35 is provided on the housing section 12.

The flushing member 31 has in its lower region a cylindrical segment 37 with a flushing channel 38 in the form an elbow duct which opens out into a connection opening 39 located on the cylindrical circumferential surface of the flushing member corresponding in form and dimension to the openings 36. The openings 36 on the cylindrical distributor surface 34 of the housing section 12 are arranged at a peripheral distance from one another which is smaller than the peripheral dimension of the connection opening 39 of the flushing member 31.

The flushing member 31 has an axial shoulder 40 onto which the flushing channel 38 opens out and which is rotatably engaged in a cylindrical bearing opening 41 of a bearing member 42 firmly attached in the lower housing section 12. The bearing member 42 forms at the same time a sludge drain chamber 43.

The flushing member 31 has an axial shaft 44, via which it is driven during filter operation. This follows by means of a rotary drive 45, which is mounted on the housing cover 15 and whreof the transmission 46 is located in the space enclosed by the filter elements 22, 23 on the interior of the filter chamber 21. There is, however, the possibility of arranging the entire rotary drive 45 in the filter chamber 21. As rotary drive an electrical or even hydraulic drive can be used, which rotates the flushing member 31 either continuously or stepwise during filter operation. The rotary drive transmission 46 is connected via a disengageable clutch 47 with the shaft 44 of the flushing member 31.

As FIG. 3 shows in particular, a sludge drain valve 48 is horizontally arranged in the chamber 43 forming the sludge drain, the valve cone 49 whereof is connected with a control piston 50, which is sealed by a piston bore 51 at the periphery of the housing section 12. A valve spring 71 supported on a spring abutment 52 screwed externally on the housing section 12, presses the valve into its closed position in which its valve cone 49 rests against the valve seat 53. In the closed position of the sludge drain valve 48 the sludge drain is blocked. On the outside of the housing section 12 a connection fitting 54 is arranged, by which the sludge occurring during flush-back of the individual filter elements is drained off. Behind the sludge drain valve 48 there is an exchangeable throttle 55 in the form of a hexagon screw arranged in the sludge drain passage which controls the flush volume discharged upon back-flushing. The control piston 50 is loaded on its annular piston surface by the pressure of the medium to be filtered (oil) prevailing in the intake chamber 57 of the filter, whereby the valve cone 49 is raised from its seat 53 against the restoring force of the valve spring 71 and, accordingly, the sludge drain valve opened. When the pressure within the intake chamber 57 drops, i.e. when the filter system is disconnected, the valve 48 automatically closes the discharge into the sludge drain pipe, thus preventing the filter chamber 21, in which the filtrate is located, from running empty.

With the closure member of the sludge drain valve 48, an indicator pin 58 is connected, which, with the valve 48 open, protrudes through an opening 59 in the spring abutment 32 and thus indicates the opening position of the valve.

In operation the liquid filter medium, e.g. oil, flows via the inlet 14 to the flush-back filter. The flowing medium is distributed via the openings 36 to the individual filter elements 22 and 23, whereby it enters via the elbow ducts 35 of the lower housing section 12 from below into the filter elements 22, 23, as indicated by arrows in FIG. 2 and arrives at the filter chamber 21 after passage through the filter fabric of the filter elements, from which it is drained off as filtrate via the filter outlet 13. By the self-rotating flushing member 31, the individual filter elements 22 and 23 are constantly cleaned in sequence. Thereby a part of the filtrate located in the filter chamber 21 flows in counter-direction through that filter element 22 resp. 23, which is connected at the lower end via the duct 35 with the flushing channel 38 of the flushing member 31 and so too by the opened valve 48 with the sludge drain. As the openings 36 of the ducts 35 at the cylindrical distributor surface 34 are arranged at a circumferential distance x from one another, which is smaller than the peripheral dimension of the connection opening 39 of the flushing member 31, the flushing of the individual filter elements is effected by overlapping, i.e. in such a way that in each case prior to switching off the last back-flushed filter element the next following filter element is coupled via the connection opening 39 of the flushing member 31 with the sludge drain. In this way pressure surges are avoided. During the filter operation, as mentioned, there is a permanent flush-back by means of the rotary flushing member 31, whereby due to the large number of filter elements 22, 23, a maximum of 10% of the filtrate available must be drawn off from the chamber 21 for flushing purposes. A sweeping flushing effect can be achieved with a low flushing oil requirement. The flushing member rotates e.g. at a speed of 0.5–2 revolutions per minute. The drive is, as mentioned, electrical or hydraulic, whereby in the last named case the filtered oil or the like can be used as hydraulic drive medium. As the flushing member 31 has a relatively small diameter a small construction, low-powered rotary drive can be used to drive it.

On the interior of the filter chamber 21 there is a cylindrical safety filter 60, which encloses the filter insert formed from the filter cartridges 22, 23. The safety filter 60 is likewise detachably and exchangeably mounted in the filter housing. It encloses in the lower region the apertured plate 29. The safety filter consists of a cylindrical connection sleeve 61, which is covered on its inner side with a filter fabric. The mesh width of the filter fabric 62 of the safety filter 60 is two to four times larger than the mesh width of the filter fabric of the filter elements 22 and 23. The safety filter 60, therefore, fulfills the function of the so-called indicator filter, which previously had to be built into the filter circuit regardless of the flush-back filter. As in the case of the flush-back filter according to the invention, the safety filter 60 is arranged in the filter housing, a particularly simple and compact construction of the filter equipment results as well as the possibility of mounting the flush-back filter close to the motor or the like to be supplied with oil. Furthermore, there is the chance of switching a by-flow arrangement in the form of a free-jet centrifuge directly into the sludge drain pipe without additional valve expenditure, as the filter continuously discharges about 10% oil.

The flush-back filter according to the invention can, as shown in FIGS. 1 and 2, be mounted vertically or even horizontally. A magnetic plug 63 (FIG. 3) can be arranged in the sludge drain, in order to extract magnetic impurities from the sludge.

The filter cartridges have for this purpose a diameter of less than 30 mm, which offers the possibility of using direct longitudinal seam-welded filter tubings without outer reinforcement. With the use of larger diameters, the fabric can no longer be made sufficiently resistant to internal pressure.

Having described my invention, I claim:

1. A flush-back filter having an axis comprising a filter housing, a filter inlet, a filter outlet, a group of filter elements, a sludge drain and a rotary flushing member, said filter elements being arranged in at least two concentric circles, ducts arranged in a circle around the filter axis communicating with said filter elements, each of said ducts opening out into an opening on a cylindrical distributor surface to which said flushing member faces with its peripheral surface and, said flushing member having a diameter which is smaller than the diameter of the inner circle of said filter elements and a flushing channel which opens into a connection opening on its cylindrical peripheral surface adapted to successively engage said cylindrical distributor surface openings.

2. The flush-back filter according to claim 1, wherein at least seven filter elements are circumferentially spaced from one another on each of said filter element circles.

3. The flush-back filter according to claim 2, wherein the radii of said filter circles differ by less than the diameter of an individual filter element.

4. The flush-back filter according to claim 1 wherein said cylindrical distributor openings of said ducts are spaced on the cylindrical distributor surface a distance from one another which is smaller than the circumferential dimension of the connection opening of said flushing member.

5. The flush-back filter of claim 1 wherein said housing is provided with an apertured plate and said filter elements are removably threaded on said apertured plate.

6. The flush-back filter of claim 5 wherein said apertured plate is detachably held in said filter housing.

7. The flush-back filter of claim 1 wherein said housing is provided with a safety filter having a mesh at least twice as large as the mesh of said filter elements.

8. The flush-back filter of claim 7 wherein said safety filter is detachably arranged in said filter housing.

9. The flush-back filter of claim 8 wherein said safety filter consists of a cylindrical connection sleeve covered on the inside with a filter gauze.

10. The flush-back filter of claim 7 wherein said safety filter closely encircles said apertured plate.

11. The flush-back filter of claim 1 wherein said sludge drain has a sludge drainage valve.

12. The flush-back filter of claim 11 wherein said sludge drainage valve has a control piston loaded by pressure at the filter inlet side.

13. The flush-back filter of claim 11 wherein said sludge drainage valve is positioned horizontally below said flushing member.

14. The flush-back filter of claim 11 wherein said flushing member has an axial shoulder rotationally engaging a chamber arranged in said filter housing forming said sludge drain.

15. The flush-back filter of claim 11 wherein a throttle is arranged in said sludge drain.

16. The flush-back filter of claim 1 wherein said flushing member is driven by a rotary drive mechanism in said filter housing encircled by said filter elements.

17. The flush-back filter of claim 1 including a hydraulic rotary drive mechanism driving said flushing member with continuous revolutionary speed using said filtrate as the drive means.

18. The flush-back filter of claim 1 wherein said filter housing comprises: a first housing section including said filter outlet and a filter chamber housing said filter elements, a second housing section including said filter inlet and said sludge drain; and, means enabling interconnection of said first housing section and said second housing section in various rotational alignments.

* * * * *